United States Patent [19]
Wu

[11] Patent Number: 5,954,449
[45] Date of Patent: Sep. 21, 1999

[54] CONNECTING DEVICE FOR CONNECTING A FAN BLADE TO A ROTOR OF A MOTOR OF A CEILING FAN

[76] Inventor: San-Chi Wu, No. 69, Sung-Chu Rd., Pei-Tun Dist., Taichung City, Taiwan

[21] Appl. No.: 09/193,427
[22] Filed: Nov. 17, 1998
[51] Int. Cl.⁶ ..................................................... B25G 3/00
[52] U.S. Cl. ............................ 403/315; 403/329; 416/206
[58] Field of Search ...................... 416/5, 210 R, 416/205, 206, 207; 403/315, 316, 317, 318, 319, 335, 336, 331, 363, 329, 326, 353, 332, 333, 334, 354, 364

[56] References Cited

U.S. PATENT DOCUMENTS

| | | | |
|---|---|---|---|
| 1,935,314 | 11/1933 | Finch et al. | 416/5 |
| 4,511,310 | 4/1985 | Pearce | 416/5 |
| 5,180,284 | 1/1993 | Monrose, III et al. | 416/206 |
| 5,237,889 | 8/1993 | Conrad | 403/317 |
| 5,722,814 | 3/1998 | Yu | 416/5 |

Primary Examiner—Lynne Reichard
Assistant Examiner—David E. Bochna
Attorney, Agent, or Firm—Ladas & Parry

[57] ABSTRACT

A connecting device is provided to connect a fan blade to a rotor of a motor of a ceiling fan. The connecting device includes a bottom member disposed transverse to and rotated about an axial direction of the rotor. A circumferential wall extends upwardly from a periphery of the bottom member. A mounting arm has an anchored end adapted for mounting the fan blade thereon, and an anchoring end disposed to be brought to anchor on the bottom member such that the mounting arm is oriented in a radial direction relative to the bottom member. A limiting unit is disposed between the anchoring end and the bottom member to limit further movement of the anchoring end relative to the bottom member once the anchoring end is pulled away from the bottom member. At the same time, a biasing member is disposed to bias the anchoring end to move away from the bottom member. By virtue of the limiting unit and the biasing member, the anchoring end can anchor on the bottom member steadily and conveniently.

3 Claims, 5 Drawing Sheets

CONNECTING DEVICE FOR CONNECTING A FAN BLADE TO A ROTOR OF A MOTOR OF A CEILING FAN

BACKGROUND OF THE INVENTION

1. Field of the Invention

This invention relates to a connecting device for a ceiling fan, more particularly to a connecting device for connecting a fan blade to a rotor of a motor of a ceiling fan.

2. Description of the Related Art

Referring to FIGS. 1 to 3, a conventional ceiling fan 10 is shown to include an outer casing 11 for housing a motor 12, a hanging rod 13 which extends upwardly from the motor 12 to be fixed on a ceiling, and a plurality of mounting arms 14 for connecting a plurality of fan blades 15 to a rotor 122 of the motor 12. Each mounting arm 14 has first and second end plates 143, 141 which are respectively secured on the corresponding fan blade 15 and a bottom of the rotor 122 by screw fasteners 144, 121. However, it is inconvenient to assembly of the mounting arms 14 due to the use of the screw fasteners 144, 121. Moreover, excessive tightening of the screw fasteners 121 at the second end plate 141 can cause the latter to break. On the other hand, insufficient tightening of the screw fasteners 121 can result in vibration of the mounting arms 14 and in eventual removal of the mounting arms 14 from the rotor 122 when the ceiling fan 10 rotates.

SUMMARY OF THE INVENTION

The object of the present invention is to provide a connecting device which can interconnect conveniently and steadily the fan blade and the rotor of the motor of the ceiling fan.

According to this invention, a connecting device includes a bottom member which has a periphery adapted to be attached on the rotor, and which is disposed transverse to and which is rotated about an axial direction of the rotor. A circumferential wall extends upwardly from the periphery. A mounting arm has an anchored end which is adapted for mounting the fan blade thereon, and an anchoring end which is disposed to be brought to anchor on the bottom member such that the mounting arm is oriented in a radial direction relative to the bottom member. Two engaging grooves and two coupling members are disposed between the anchoring end and the bottom member to limit further movement of the anchoring end relative to the bottom member once the anchoring end is pulled away from the bottom member in the radial direction. A biasing member is disposed to bias the anchoring end to move away from the bottom member in the radial direction once the anchoring end has been brought to anchor on the bottom member.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
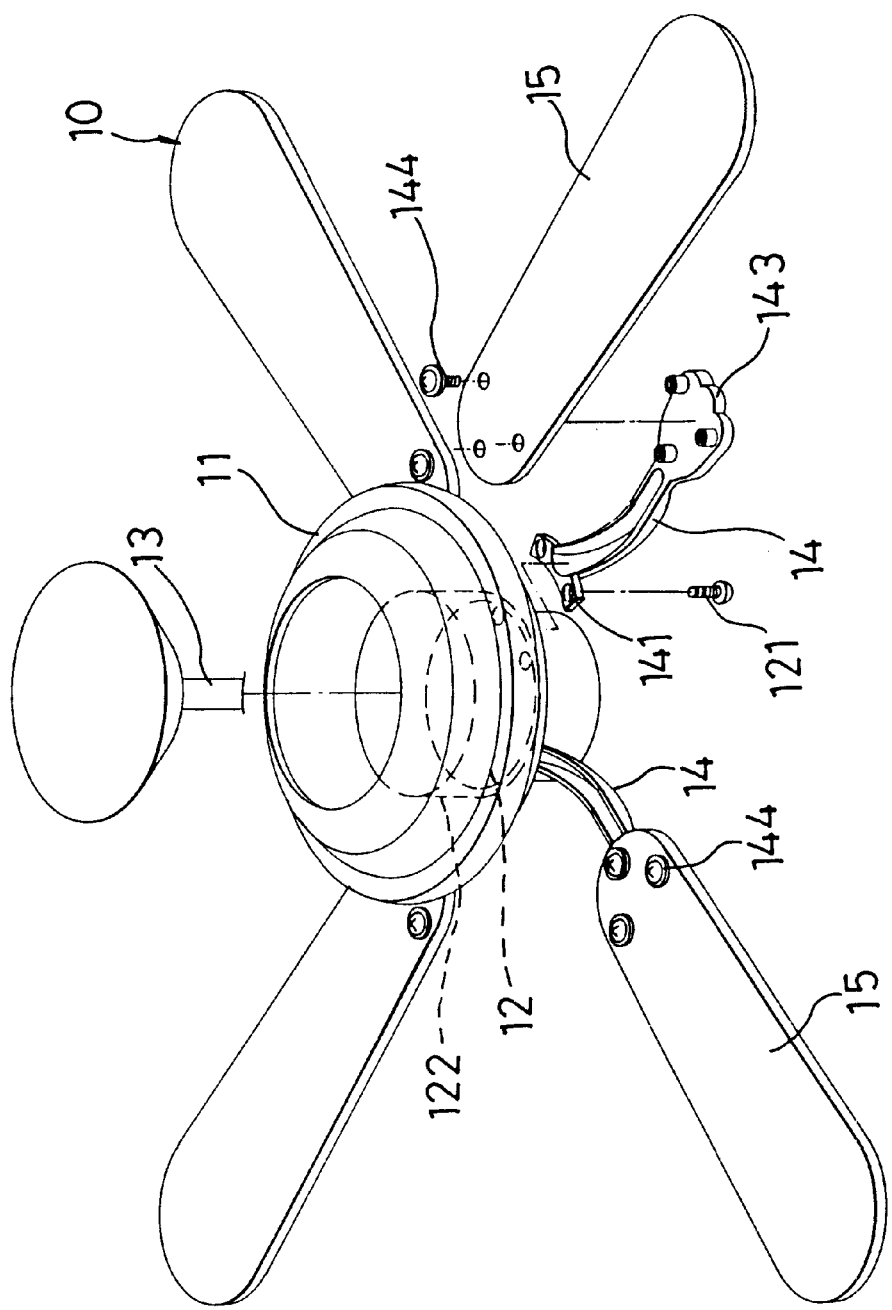
FIG. 1 is an exploded view of a conventional ceiling fan.
Figure 2:
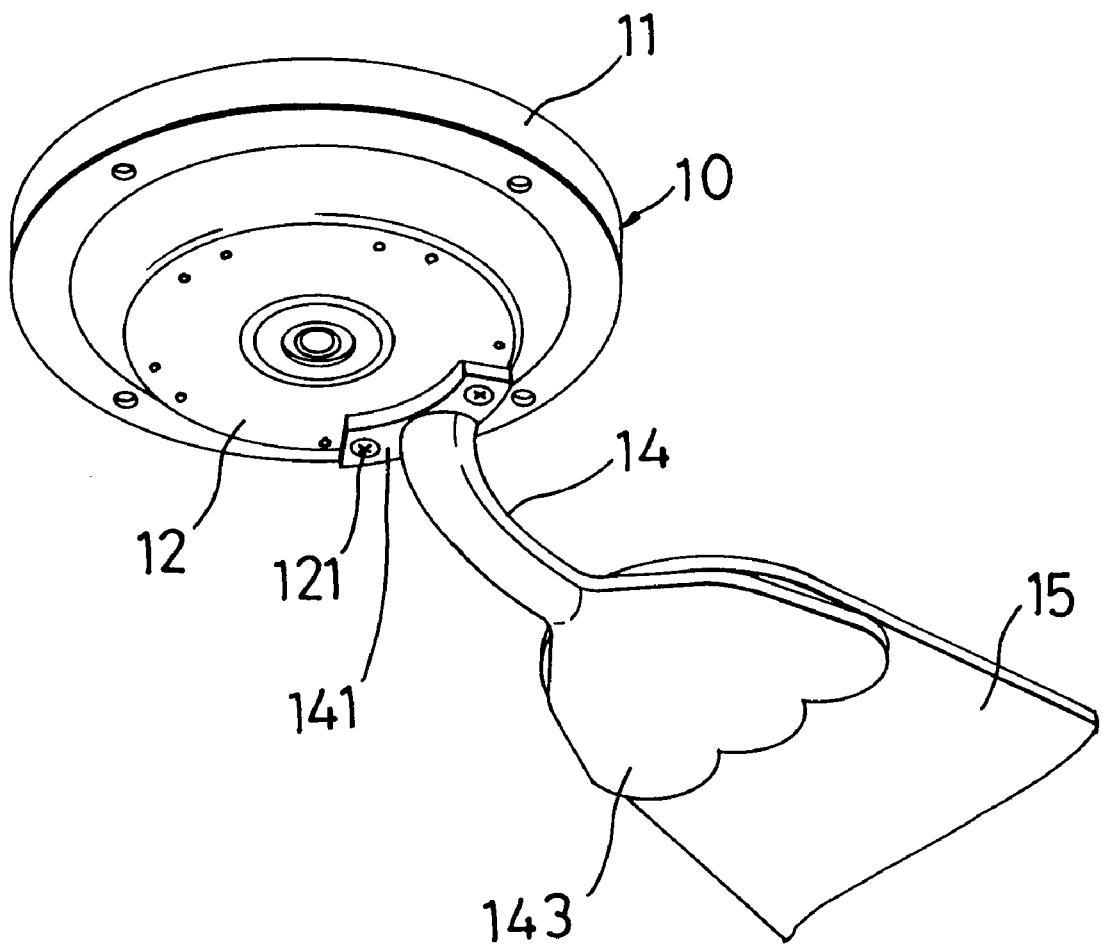
FIG. 2 is a bottom view showing a connecting device of the conventional ceiling fan.
Figure 3:
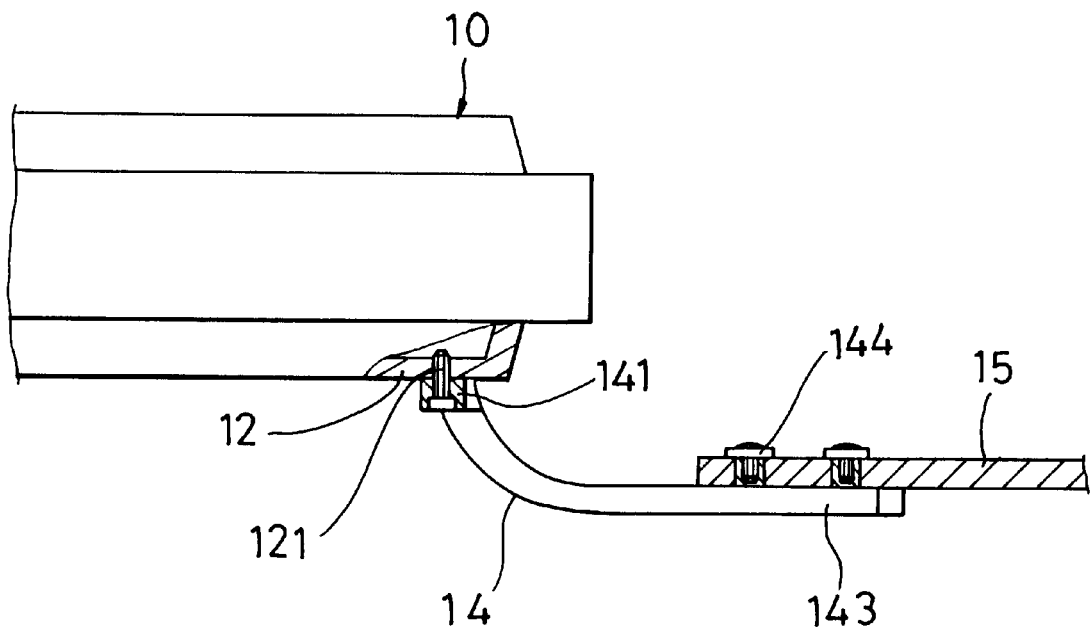
FIG. 3 is a sectional view of the connecting device of the conventional ceiling fan.

Before the present invention is described in greater detail, it should be noted that same reference numerals have been used to denote like elements throughout the specification.

Figure 4:
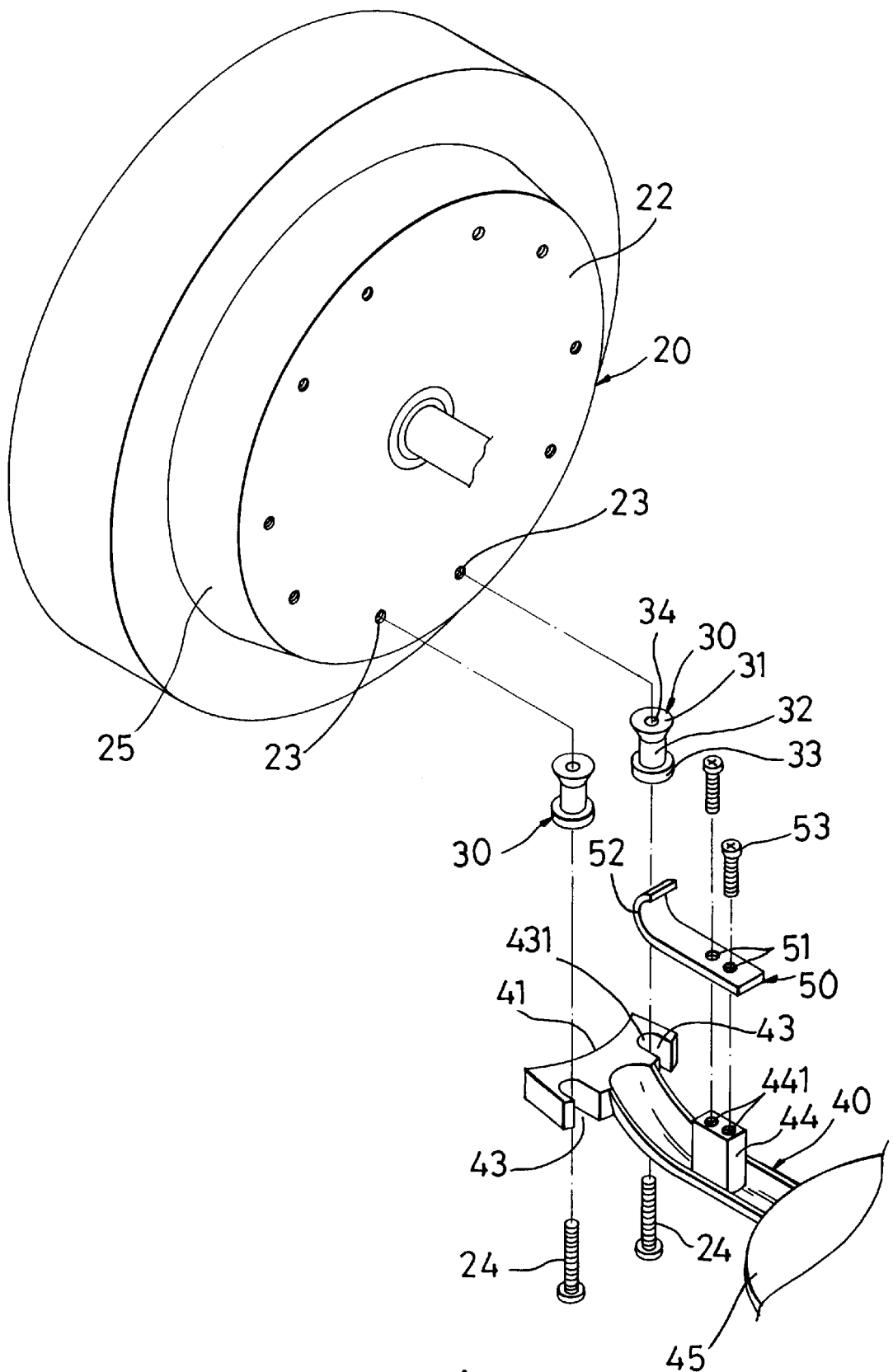
FIG. 4 is an exploded view of a first preferred embodiment of a connecting device according to this invention.
Figure 5:
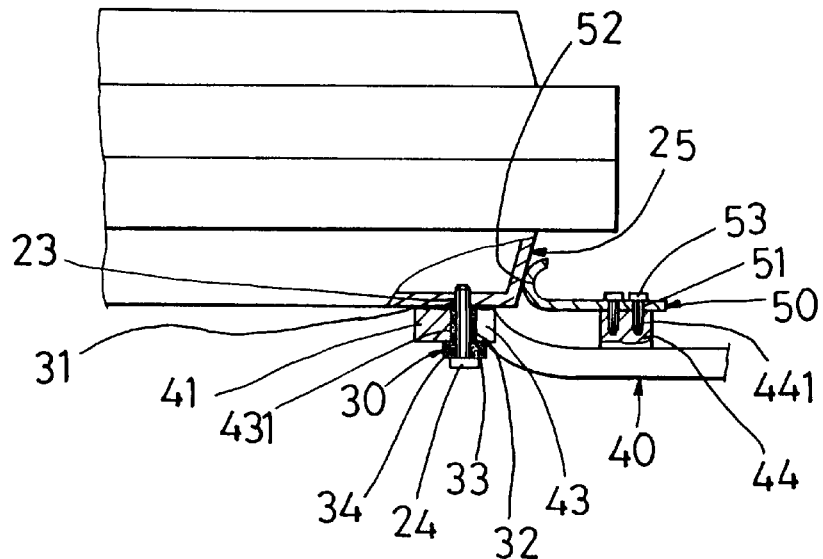
FIG. 5 is a sectional view illustrating the first preferred embodiment when used to connect a fan blade to a rotor of a motor of a ceiling fan.

Referring to FIGS. 4 and 5, the first preferred embodiment of a connecting device according to the present invention is shown to be adapted to connect a fan blade (not shown) to a rotor (not shown) of a motor 20. The rotor has a bottom member 22 which is disposed transverse to the axial direction, and which has many pairs of screw holes 23 formed therein adjacent to a periphery thereof. Each pair of the screw holes 23 are provided for mounting a connecting device of this preferred embodiment. A circumferential wall 25 extends upwardly from the periphery of the bottom member 22.

Two elastomeric coupling members 30 are mounted on the bottom member 22. Each coupling member 30 includes a shank 32 with upper and lower ends, and upper and lower peripheral flanges 31, 33 which project radially and outwardly from the upper and lower ends of the shank 32, respectively. A through hole 34 extends axially through the shank 32 such that a screw fastener 24 can pass through the through hole 34 and engage in the respective screw hole 23 to secure the coupling member 30 on the bottom member 22.

A mounting arm 40 includes an anchored end 45 adapted to be connected to the fan blade, and a plate-like anchoring end 41. Two U-shaped engaging grooves 43 are formed in the anchoring end 41. Each engaging groove 43 has an open end which faces outwardly and radially, and extends in a radial direction to form an abutment end 431. The dimension of the engaging groove 43 is larger than that of the shank 32 and is smaller than that of the lower peripheral flange 33. As such, each coupling member 30 can be fitted in the corresponding engaging groove 43 from the open end toward the abutment end 431 to abut against the abutment end 431, thereby limiting further movement of the anchoring end 41 outwardly relative to the bottom member 22.

A mounting block 44 is disposed on the mounting arm 40 between the anchored and anchoring ends 45, 41, and extends downwardly from the mounting arm 40. The mounting block 44 has two screw holes 441. A plate-like biasing member 50 has two locking holes 511 at one end thereof such that two screw fasteners 53 pass through the locking holes 511 and engage threadedly the screw holes 441 to secure the biasing member 50 on the mounting block 44. The biasing member 50 has the other end thereof formed with an engaging spring portion 52 which extends toward the anchoring end 41 in the radial direction to abut against the circumferential wall 25 of the rotor.

As illustrated, the coupling members 30 and the mounting arm 40 can be secured on the bottom member 22 and the fan blade by operators in a manufacturing plant, respectively. In use, when it is desired to assemble the fan blade on the bottom member 22, the biasing member 50 is first secured on the mounting block 44 of the mounting arm 40 by the screw fasteners 53. Then, the anchoring end 41 is moved toward the coupling members 30 in the radial direction to permit each shank 32 to move relative to the corresponding engaging groove 43 from the open end until the shank 32 abuts against the abutment end 431. The engaging spring portion 52 of the biasing member 50 abuts against the circumferential wall 25 so as to retain firmly the anchoring end 41 on the bottom member 22. In addition, the lower peripheral flange 33 can prevent downward removal of the anchoring end 41 from the coupling members 30. Thus, the fan blade can be connected steadily to the rotor of the ceiling fan. The elastomeric coupling members 30 can prevent vibration of the mounting arm 40 when the ceiling fan is operated.

It is noted that the assembly of the coupling members 30 on the bottom member 22, and the assembly of the anchored end 45 of the mounting arm 40 on the fan blade can be conducted in the manufacturing plate. Therefore, the problem associated with excessive and insufficient tightening of the screw fasteners in the prior art can be obviated.

Figure 6:
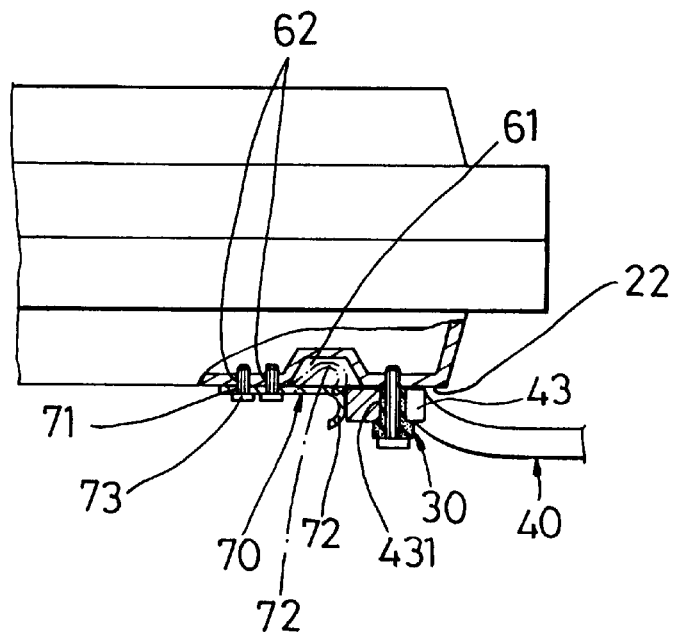
FIG. 6 is a sectional view illustrating the second preferred embodiment of a connecting device according to this invention when used to connect a fan blade to a rotor.

Alternatively, referring to FIG. 6, the second preferred embodiment of the connecting device according to this invention is shown to be generally similar to the first preferred embodiment, except the biasing member 70 has an inner end with locking holes 71 such that screw fasteners 73 pass through the locking holes 71 to engage threadedly screw holes 62 in the bottom member 22 so as to secure the inner end of the biasing member 70 on the bottom member 22. The biasing member 70 further has an outer end which extends outwardly in the radial direction toward the anchoring end 41 of the mounting arm 40 and which has an engaging spring portion 72 to provide a biasing force for biasing against the anchoring end 41, and a middle portion between the inner and outer ends. The bottom member 22 has a concavity 61 which can receive the middle portion when the biasing member 70 is bent against the biasing force thereof so as to be steered away from the anchoring end 41, thereby preventing the biasing member 70 from hindering the assembly of the anchoring end 41 on the coupling members 30.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A connecting device for connecting a fan blade to a rotor of a motor of a ceiling fan, the motor including a stator and the rotor which is concentrically surrounded by the stator and which is rotated about an axial direction, said connecting device comprising:

a bottom member with a periphery adapted to be attached on the rotor and spaced apart from the stator in the axial direction, said bottom member being disposed transverse to and being rotated about the axial direction;

a circumferential wall extending upwardly from said periphery;

a mounting arm including an anchored end adapted for mounting the fan blade thereon, and an anchoring end disposed to be brought to anchor on said bottom member such that said mounting arm is oriented in a radial direction relative to said bottom member;

means for limiting further movement of said anchoring end relative to said bottom member through a resisting force generated in a circumferential direction of said bottom member once said anchoring end is pulled away from said bottom member in said radial direction, said limiting means being disposed between said mounting arm and said bottom member; and a biasing member disposed to be brought to bias said anchoring end to move away from said bottom member in said radial direction once said anchoring end has been brought to anchor on said bottom member; wherein said limiting means includes:

two engaging grooves which are formed in said anchoring end, each of said engaging grooves having an open end that faces outwardly and radially, each of said engaging grooves extending in said radial direction to form an abutment end distal to said anchored end; and two coupling members disposed on said bottom member adjacent to said periphery, each of said coupling members including a shank having an upper end which is mounted on said bottom member and a lower end which extends downwardly from said upper end, and a peripheral flange projecting radially and outwardly from said lower end and of a dimension larger than that of a respective one of said engaging grooves such that each of said coupling members is fitted in a respective one of said engaging grooves from said open end toward said abutment end through the resisting force generated by abutment of said shank against said abutment end once said anchoring end is pulled away from said bottom member.

2. A connecting device for connecting a fan blade to a rotor of a motor of a ceiling fan, the motor including a stator and the rotor which is concentrically surrounded by the stator and which is rotated about an axial direction, said connecting device comprising:

a bottom member with a periphery adapted to be attached on the rotor and spaced apart from the stator in the axial direction, said bottom member being disposed transverse to and being rotated about the axial direction;

a circumferential wall extending upwardly from said periphery;

a mounting arm including an anchored end adapted for mounting the fan blade thereon, and an anchoring end disposed to be brought to anchor on said bottom member such that said mounting arm is oriented in a radial direction relative to said bottom member;

means for limiting further movement of said anchoring end relative to said bottom member through a resisting force generated in a circumferential direction of said bottom member once said anchoring end is pulled away from said bottom member in said radial direction, said limiting means being disposed between said mounting arm and said bottom member; and a biasing member disposed to be brought to bias said anchoring end to move away from said bottom member in said radial direction once said anchoring end has been brought to anchor on said bottom member, wherein said biasing member has an end disposed on said mounting arm between said anchored and anchoring ends, and an opposite end extending toward said anchoring end in said radial direction and formed with an engaging spring portion that abuts against said circumferential wall.

3. The connecting deice as claimed in claim 1, wherein said biasing member has an inner end secured to said bottom member, an outer end extending outwardly in said radial direction toward said anchoring end of said mounting arm and having an engaging spring portion to provide a biasing force for biasing said anchoring end away from said bottom member, and a middle portion between said inner and outer ends, said bottom member having a concavity for receiving said middle portion when said biasing member is bent against said biasing force thereof so as to permit said engaging spring portion to be steered away from said anchoring end.

* * * * *